(12) United States Patent
Sowul et al.

(10) Patent No.: US 8,627,928 B2
(45) Date of Patent: Jan. 14, 2014

(54) FLUID DISPLACING TRANSMISSION FILLER

(75) Inventors: Henryk Sowul, Oxford, MI (US); Xiaoqing Zeng, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 68 days.

(21) Appl. No.: 12/969,180

(22) Filed: Dec. 15, 2010

(65) Prior Publication Data

US 2011/0200781 A1    Aug. 18, 2011

Related U.S. Application Data

(60) Provisional application No. 61/338,306, filed on Feb. 16, 2010.

(51) Int. Cl.
*B32B 5/20* (2006.01)
*B32B 27/40* (2006.01)

(52) U.S. Cl.
USPC .......................................................... 184/106

(58) Field of Classification Search
USPC ....... 184/6.12, 106; 74/467, 606 R; 264/46.6; 206/814
See application file for complete search history.

(56) References Cited

U.S. PATENT DOCUMENTS

| | | | | |
|---|---|---|---|---|
| 4,420,990 A | * | 12/1983 | Hauser | 74/606 R |
| 5,018,407 A | * | 5/1991 | Hoecht | 74/606 R |
| 5,092,196 A | * | 3/1992 | Kameda et al. | 74/606 R |
| 6,938,731 B2 | * | 9/2005 | Slesinski | 184/6.25 |
| 2002/0057522 A1 | * | 5/2002 | Bernett et al. | 360/97.01 |
| 2007/0166529 A1 | * | 7/2007 | Hsu | 428/304.4 |

* cited by examiner

*Primary Examiner* — William E Dondero
*Assistant Examiner* — Mark K Buse

(57) ABSTRACT

The present invention provides a fluid displacing transmission filler having a blow molded, foam filled body. The body or shell of the filler is blow molded in a mold which shapes it to conform to internal surfaces and other features, such as gears and shafts, of a transmission. Then, the blow molded filler body is filled with closed cell foam. The resulting transmission filler is lightweight, achieves a maximum volume for an available space within a transmission and is essentially impervious to failure and filling with fluid because the closed cell foam does not significantly absorb transmission fluid.

19 Claims, 2 Drawing Sheets

FLUID DISPLACING TRANSMISSION FILLER

CROSS REFERENCE TO RELATED APPLICATION

This application claims the benefit of U.S. Provisional Patent Application Ser. No. 61/338,306, filed Feb. 16, 2010, which is hereby incorporated in its entirety herein by reference.

FIELD

The present disclosure relates to fillers for motor vehicle transmissions and more particularly to a filler for a motor vehicle transmission which displaces oil or transmission fluid and thus reduces the total volume or fill of fluid required for the transmission.

BACKGROUND

The statements in this section merely provide background information related to the present disclosure and may or may not constitute prior art.

Many motor vehicle transmissions, both dual clutch automatic (DCT) and manual types, depend upon splash lubrication to provide lubrication to their moving parts. Essentially splash lubrication comprehends submerging certain components at least partially in transmission fluid and relying upon the fluid drawn into the rotating components and thrown or slung about the transmission in mist or droplets to adequately lubricate all the transmission components.

This lubrication scheme therefore depends, to a great extent, on the submergence depth of the components and such depth, of course, depends simply upon how filled with fluid the transmission housing is. Clearly, therefore, splash lubrication, solely from a lubrication standpoint, is more effective the more or the higher the fluid level is in the transmission.

Simply substantially filling the transmission with fluid is not a reasonable approach, however, as excessive transmission fluid adds weight, increases losses in the transmission and is costly. Thus it is an appropriate engineering inquiry to determine how to provide the maximum necessary lubrication with minimum transmission fluid.

An approach long utilized is to attempt to closely conform the inside surface and volume of the transmission to the contours and outline of the gears, shafts and other components such that large regions or pockets of essentially inactive lubricant are eliminated. While this is generally done, the demands of metal casting techniques, that is, the need to have draft in the molds to facilitate removal of the castings from the mold limits the viability of this approach.

Another approach has been the installation of fillers in transmissions—complex inserts which conform on one or more sides to the internal contours of the transmission housing and on other sides to transmission components such as shafts or gears. Since they are fluid tight and fabricated of lightweight materials, such fillers both displace the transmission fluid, thereby requiring less volume to fill the transmission and lower the overall weight of the transmission.

Oftentimes such fillers are hollow, blow molded articles. Such blow molded fillers, when intact, provide excellent volume to weight ratios but are unfortunately prone to leakage and rupture. When such a blow molded filler fails, it fills with transmission fluid. Thus, the lubrication fluid level in the transmission lowers and effective splash lubrication action may be compromised.

Another filler construction utilizes two molded halves having friction welded flanges. Here, a pair of mating flanges extends around the parting line of the two halves of the filler and the filler is assembled by friction welding the two flanges together. While such a construction is generally stronger than a blow molded filler, the peripheral friction welded flange reduces the overall size and volume of the device and thus reduces its displacement and effectiveness.

While it is apparent from the foregoing that transmission fillers serve a practical and useful purpose in motor vehicle transmissions, it is also apparent that improvements in them are desirable.

SUMMARY

The present invention provides a fluid displacing transmission filler having a blow molded, foam filled body which resolves problems inherent in prior art transmission fillers. The body or shell of the filler is blow molded in a mold to shape it to conform to internal surfaces and other features, such as gears and shafts, of a transmission. Then, the blow molded filler body is filled with a lightweight, non-fluid absorbing material such as closed cell foam. The resulting transmission filler is lightweight, achieves a maximum volume for an available space within a transmission and is essentially impervious to failure and filling with transmission fluid because the closed cell foam does not significantly absorb transmission fluid. The body or shell is preferably molded of a thermoplastic elastomer and the closed cell foam is preferably rigid polyurethane.

Thus it is an aspect of the present invention to provide an improved transmission filler.

It is a further aspect of the present invention to provide a transmission filler having a blow molded body or shell and an interior filled with a lightweight, non-fluid absorbing material.

It is a still further aspect of the present invention to provide a transmission filler having a blow molded body or shell of a thermoplastic elastomer and a foam filled interior.

It is a still further aspect of the present invention to provide a transmission filler having a blow molded body or shell and an interior filled with a closed cell foam.

It is a still further aspect of the present invention to provide a transmission filler having a blow molded body or shell and an interior filled with a closed cell polyurethane foam.

It is a still further aspect of the present invention to provide a transmission filler having a blow molded body or shell of a thermoplastic elastomer and an interior filled with a closed cell polyurethane foam.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
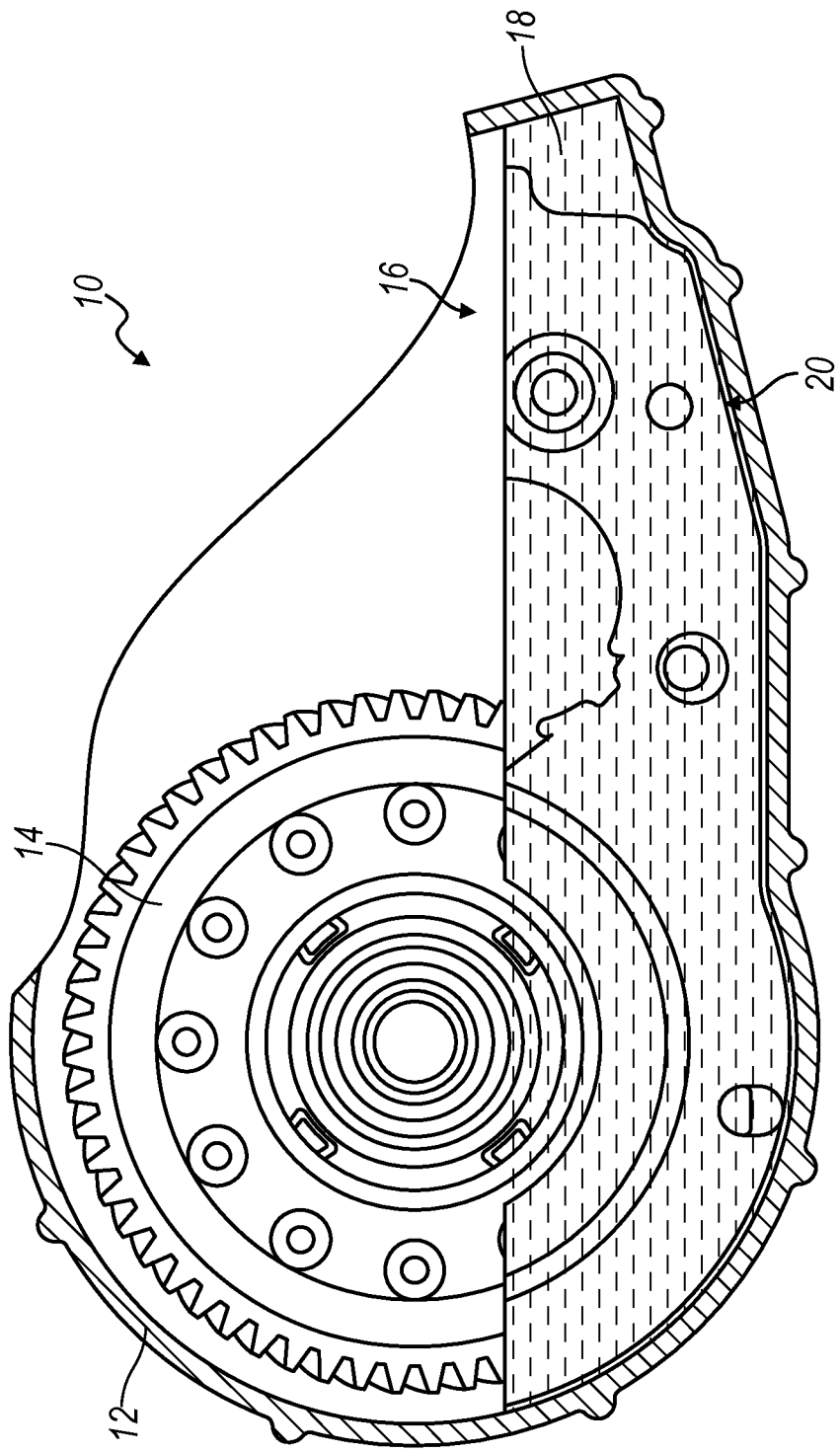
FIG. 1 is an end elevational view of a motor vehicle transmission and housing with portions broken away including a transmission filler according to the present invention.

With reference to FIG. 1, a portion of a motor vehicle transmission is illustrated and generally designated by the reference number 10. The transmission 10 includes a housing 12 having various flanges, openings and other features which receive, support and protect the numerous internal components of the transmission 10 such as a differential ring gear 14. The housing 12 defines a sump 16 in its lower portion in which the transmission oil or fluid 18 resides and to which it returns and collects after circulating within the transmission housing 12.

Disposed in the sump 16 of the transmission 10 or other comparable region of the transmission housing 12 where transmission oil or fluid 18 normally resides or collects is a transmission filler 20. As noted above, the transmission filler 20 occupies space that would otherwise be occupied by transmission oil or fluid 18 and displaces it. Thus the transmission filler 20 reduces both the total amount of oil or transmission fluid 18 required to properly fill the transmission 10 and the total weight of the transmission 10.

Figure 2:
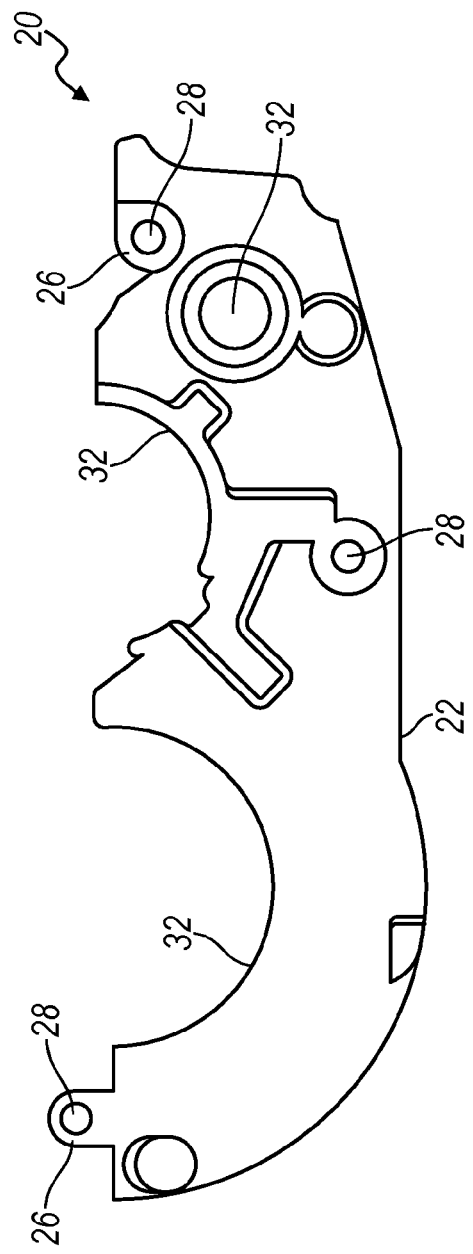
FIG. 2 is a front elevational view of a transmission filler according to the present invention having a representative and exemplary shape and exterior profile.
Figure 3:
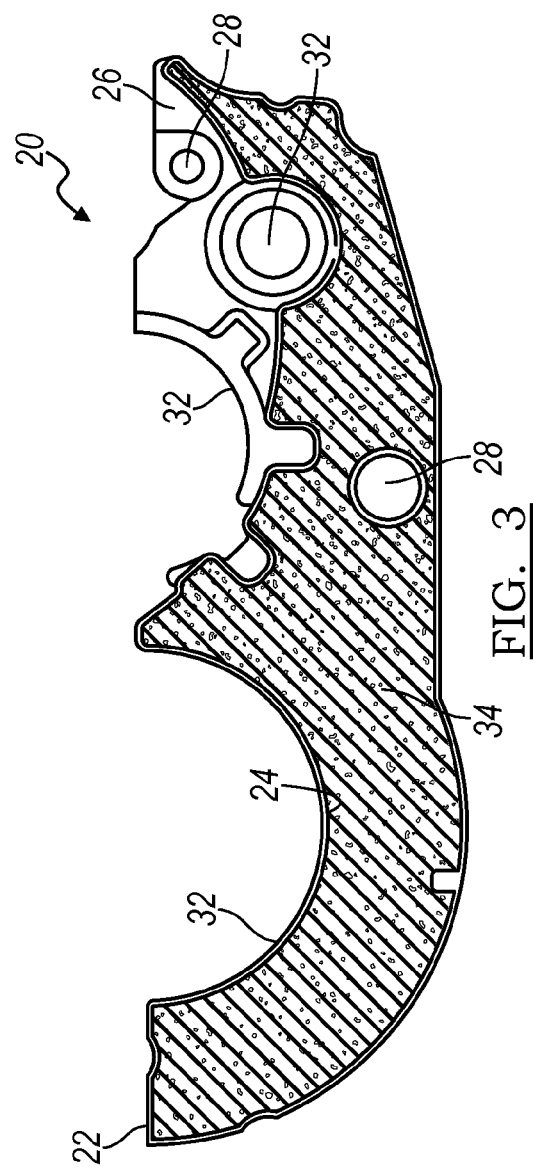
FIG. 3 is full sectional view of a transmission filler according to the present invention.

Referring now to FIGS. 2 and 3, a fluid displacing transmission filler 20 according to the present invention is illustrated. At the outset, it should be understood that the shape and profile of the filler 20 are representative and illustrative only as the actual shape of any particular transmission filler 20 will be dictated by the interior shape of the transmission 10, including any interior walls or surfaces against which the transmission filler 20 will be disposed as well as any shafts, gears, bearings or other transmission components that the transmission filler 20 will be adjacent to it in its installed position but which it must not contact or interfere with.

The transmission filler 20 includes a body or shell 22 that defines the overall shape of the transmission filler 20 and a hollow interior 24. The body or shell 22 preferably includes any required mounting tabs or features 26 which define openings 28 and cutouts or similar structures 32 that partially encircle or conform to various components within the transmission 10. Typically, the openings 28 in the mounting tabs or features 26 receive fasteners such as machine bolts (not illustrated) which secure the transmission filler 20 to the housing 12 of the transmission 10.

The body or shell 22 is preferably blow molded by conventional blow molding techniques of a thermoplastic elastomer (TPE) such as Hytrel® which is a thermoplastic polyester elastomer, a registered trademark and product of E.I. du Pont de Nemours and Company. This material and other thermoplastic elastomers provide good oil and automatic transmission fluid (ATF) resistance and durability, good mechanical strength and ductility and the required operating temperature capability of −40° C. (−40° F.) to 150° C. (300° F.).

As illustrated in FIG. 3, the interior 24 of the hollow body or shell 22 surrounds, protects and is filled with a lightweight, non-fluid absorbing material such as closed cell foam 34. The closed cell foam 34 preferably completely fills the interior 24 of the body or shell 22. The closed cell foam 34 is preferably polyurethane or a similar material. The closed cell foam 34 is essentially non-absorbtive of transmission oil or fluid 18 and thus if the body or shell 22 should leak, crack or rupture and allow such fluid to enter the interior 24 of the shell 22, little or no fluid 18 will be absorbed into the closed cell foam 34 and thus the oil or fluid displacing function of the transmission filler 20 will be maintained. The closed cell foam 34 also has good oil and automatic transmission fluid (ATF) resistance and durability, the required operating temperature capability and preferably a density lower than 0.5 grams/cu. centimeter.

It will be appreciated that both components of the transmission filler invention 20 are critical to its improved performance relative to prior art devices. The body or shell 22 surrounds, protects and contains the closed cell foam 34 thereby preventing bits or pieces of the closed cell foam 34 from breaking off and circulating with the transmission lubricant 18. Additionally, the rigid body or shell 22 maintains its shape and size, thereby maintaining its design fluid displacement. The closed cell foam 34, for its part, fills and occupies the interior 24 of the body or shell 22, thereby ensuring that if a leak or crack develops in the body or shell 22, it does not fill with transmission fluid and negate the point and purpose of the transmission filler 20.

The description of the invention is merely exemplary in nature and variations that do not depart from the gist of the invention are intended to be within the scope of the invention. Such variations are not to be regarded as a departure from the spirit and scope of the invention.

We claim:

1. A fluid displacing filler for a transmission comprising, in combination,
   a fluid impervious shell of a first material having an exterior shape conforming to at least one feature of a transmission and defining an interior volume, said interior volume filled with a closed cell foam second material of a different composition than said first material, said shell defining a periphery of the foam,
   whereby said filler displaces transmission fluid from a region within such transmission when said filler is disposed in a fluid filled transmission.

2. The filler for a transmission of claim 1 wherein said at least one feature is an inner surface, a gear, a shaft or a bearing.

3. The filler for a transmission of claim 1 wherein said first material is a thermoplastic elastomer.

4. The filler for a transmission of claim 1 wherein said closed cell foam second material is polyurethane.

5. The filler for a transmission of claim 1 wherein said filler is disposed in a sump of a transmission.

6. The filler for a transmission of claim 1 wherein said closed cell foam second material is resistant to automatic transmission fluid.

7. The filler for a transmission of claim 1 further including a plurality of lugs extending from said shell, said lugs defining fastener receiving openings for facilitating mounting said filler within a transmission.

8. A volume occupying filler for a transmission comprising, in combination,
   a fluid impervious body of a thermoplastic elastomer having an exterior surface and defining a sealed, hollow interior, at least a portion of said exterior surface conforming to a portion of an inner surface of said transmission, and
   closed cell foam of a different composition disposed within said hollow interior,
   whereby said volume occupying filler displaces transmission fluid from a region within such transmission.

9. The volume occupying filler for a transmission of claim 8 wherein said body is blow molded.

10. The volume occupying filler for a transmission of claim 8 wherein said closed cell foam is polyurethane which essentially fills said hollow interior.

11. The volume occupying filler for a transmission of claim 8 wherein said filler is disposed in a sump of a transmission.

12. The volume occupying filler for a transmission of claim 8 further including mounting tabs defining openings for facilitating installation of said filler in a transmission.

13. A fluid displacing filler for a transmission comprising, in combination, a fluid impervious shell of a first material having an outer surface and a hollow interior, a portion of said outer surface configured to conform to a portion of an inner surface of a transmission housing, and said hollow interior at least substantially filled with a lightweight, non-fluid absorbing second material of a different composition than said first material.

14. The fluid displacing filler for a transmission of claim 13 wherein said first material is a thermoplastic elastomer.

15. The fluid displacing filler for a transmission of claim 13 wherein said shell is blow molded.

16. The fluid displacing filler for a transmission of claim 13 wherein said fluid displacing filler is disposed in a sump of a transmission.

17. The fluid displacing filler for a transmission of claim 13 wherein said lightweight, non-fluid absorbing material is closed cell foam.

18. The fluid displacing filler for a transmission of claim 13 wherein said shell includes a plurality of tabs extending from said shell and defining openings for receiving fasteners for mounting said filler in a transmission.

19. The fluid displacing filler for a transmission of claim 13 wherein said shell is also configured to conform to at least one of a gear, a shaft and a bearing.

* * * * *